US011953356B2

(12) United States Patent
Shao et al.

(10) Patent No.: US 11,953,356 B2
(45) Date of Patent: Apr. 9, 2024

(54) METHODS AND INTERNET OF THINGS (IOT) SYSTEMS FOR MONITORING SMART GAS PIPELINE NETWORKS BASED ON ULTRASONIC FLOWMETERS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Lei Zhang, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/357,148

(22) Filed: Jul. 23, 2023

(65) Prior Publication Data
US 2023/0366710 A1 Nov. 16, 2023

(30) Foreign Application Priority Data
Jun. 26, 2023 (CN) .......................... 202310757123.9

(51) Int. Cl.
G06Q 10/063 (2023.01)
G01F 1/66 (2022.01)
G01F 1/667 (2022.01)

(52) U.S. Cl.
CPC .................................. G01F 1/667 (2013.01)

(58) Field of Classification Search
None
See application file for complete search history.

(56) References Cited

FOREIGN PATENT DOCUMENTS

| CA | 2989027 A1 | 6/2018 |
|---|---|---|
| CN | 103994333 A | 8/2014 |
| CN | 106682742 A | 5/2017 |
| CN | 107067080 A | 8/2017 |
| CN | 107590516 A | 1/2018 |
| CN | 107842713 A | 3/2018 |
| CN | 107976223 A | 5/2018 |
| CN | 108447229 A | 8/2018 |
| CN | 109345148 A | 2/2019 |
| CN | 109780452 A | 5/2019 |

(Continued)

OTHER PUBLICATIONS

Huang, Wenyao, Application of Acoustic Emission Detection Technology in Urban Gas Pipeline, Scientific and Technological Innovation, 2018, 3 pages.

(Continued)

*Primary Examiner* — Harshad R Patel
(74) *Attorney, Agent, or Firm* — METIS IP LLC

(57) ABSTRACT

The embodiment of the present disclosure provides a method and an Internet of Things system for monitoring a smart gas pipeline network based on an ultrasonic flowmeter. The method is implemented by a smart gas management platform of the Internet of Things system, including: acquiring distributed ultrasonic data for least at one moment, the distributed ultrasonic data including ultrasonic data acquired by the ultrasonic flowmeter and the ultrasonic flowmeter being deployed at at least one detection position of the gas pipeline network; determining a leakage risk of at least one preset point of the gas pipeline network based on the distributed ultrasonic data; and generating and sending warning information to a user based on the leakage risk.

7 Claims, 5 Drawing Sheets

(56) References Cited

FOREIGN PATENT DOCUMENTS

| | | |
|---|---|---|
| CN | 112000008 A | 11/2020 |
| CN | 112197176 A | 1/2021 |
| CN | 112633553 A | 4/2021 |
| CN | 113719764 A | 11/2021 |
| CN | 114623990 A | 6/2022 |
| CN | 114782785 A | 7/2022 |
| CN | 115063954 A | 9/2022 |
| CN | 115348282 A | 11/2022 |
| CN | 115355447 A | 11/2022 |
| CN | 115496353 A | 12/2022 |
| CN | 115619071 A | 1/2023 |
| CN | 115796408 A | 3/2023 |
| CN | 218720698 U | 3/2023 |
| CN | 116006908 A | 4/2023 |
| EA | 201591062 A1 | 10/2015 |
| EP | 4083592 A1 | 11/2022 |
| GB | 202208733 | 2/2023 |

OTHER PUBLICATIONS

Xiao, Yu, Discussion on Equipment and Safety Management Path of Natural Gas Station, China Plant Engineering, 2020, 3 pages.

METHODS AND INTERNET OF THINGS (IOT) SYSTEMS FOR MONITORING SMART GAS PIPELINE NETWORKS BASED ON ULTRASONIC FLOWMETERS

CROSS-REFERENCE TO RELATED APPLICATION

This application claims priority of Chinese Patent Application No. 202310757123.9, filed on Jun. 26, 2023, the entire contents of which are incorporated herein by reference.

TECHNICAL FIELD

The present disclosure relates to the field of the Internet of Things, and in particular, to a method and an Internet of Things (IoT) system for monitoring a smart gas pipeline network based on an ultrasonic flowmeter.

BACKGROUND

Against the backdrop of rapid urbanization and the promotion of energy conservation and emission reduction, there is an increasing demand for gas usage, and the mileage of gas pipeline networks is also growing rapidly. However, monitoring measures for gas pipeline networks are still relatively weak, and the safety risks of gas leaks and gas explosions are continuously increasing.

Therefore, it is necessary to provide a method and an Internet of Things (IoT) system for monitoring a smart gas pipeline network based on an ultrasonic flowmeter to achieve real-time monitoring of the gas pipeline network and timely detection of gas leakages in the gas pipeline network, thereby avoiding the gas explosions.

SUMMARY

One or more embodiments of the present disclosure provide a method for monitoring a smart gas pipeline network based on an ultrasonic flowmeter. The method is implemented by a smart gas management platform of an Internet of things (IoT) system for monitoring a smart gas pipeline network based on an ultrasonic flowmeter and includes: acquiring distributed ultrasonic data for at least one moment, the distributed ultrasonic data including ultrasonic data acquired by the ultrasonic flowmeter and the ultrasonic flowmeter being deployed at at least one detection position of the gas pipeline network; determining a leakage risk of at least one preset point of the gas pipeline network based on the distributed ultrasonic data; and generating and sending warning information to a user based on the leakage risk.

One or more embodiments of the present disclosure provide an Internet of things (IoT) system for monitoring a smart gas pipeline network based on an ultrasonic flowmeter. The Internet of things system includes a smart gas object platform, a smart gas sensor network platform, a smart gas management platform, a smart gas service platform, and a smart gas user platform. The smart gas object platform is configured to acquire distributed ultrasonic data for at least one moment, the distributed ultrasonic data includes ultrasonic data acquired by the ultrasonic flowmeter, and the ultrasonic flowmeter is deployed at at least one detection position of the gas pipeline network; the smart gas sensor network platform is configured to transmit the distributed ultrasonic data to the smart gas management platform; the smart gas management platform is configured to determine a leakage risk of at least one preset point of the gas pipeline network based on the distributed ultrasonic data and generate warning information based on the leakage risk; the smart gas service platform is configured to send the warning information to the smart gas user platform; and the smart gas user platform is configured to display the warning information to a user.

One or more embodiments of the present disclosure provide a non-transitory computer-readable storage medium, wherein the storage medium stores computer instructions, and when reading the computer instructions in the storage medium, a computer implements the method for monitoring a smart gas pipeline network based on an ultrasonic flowmeter.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
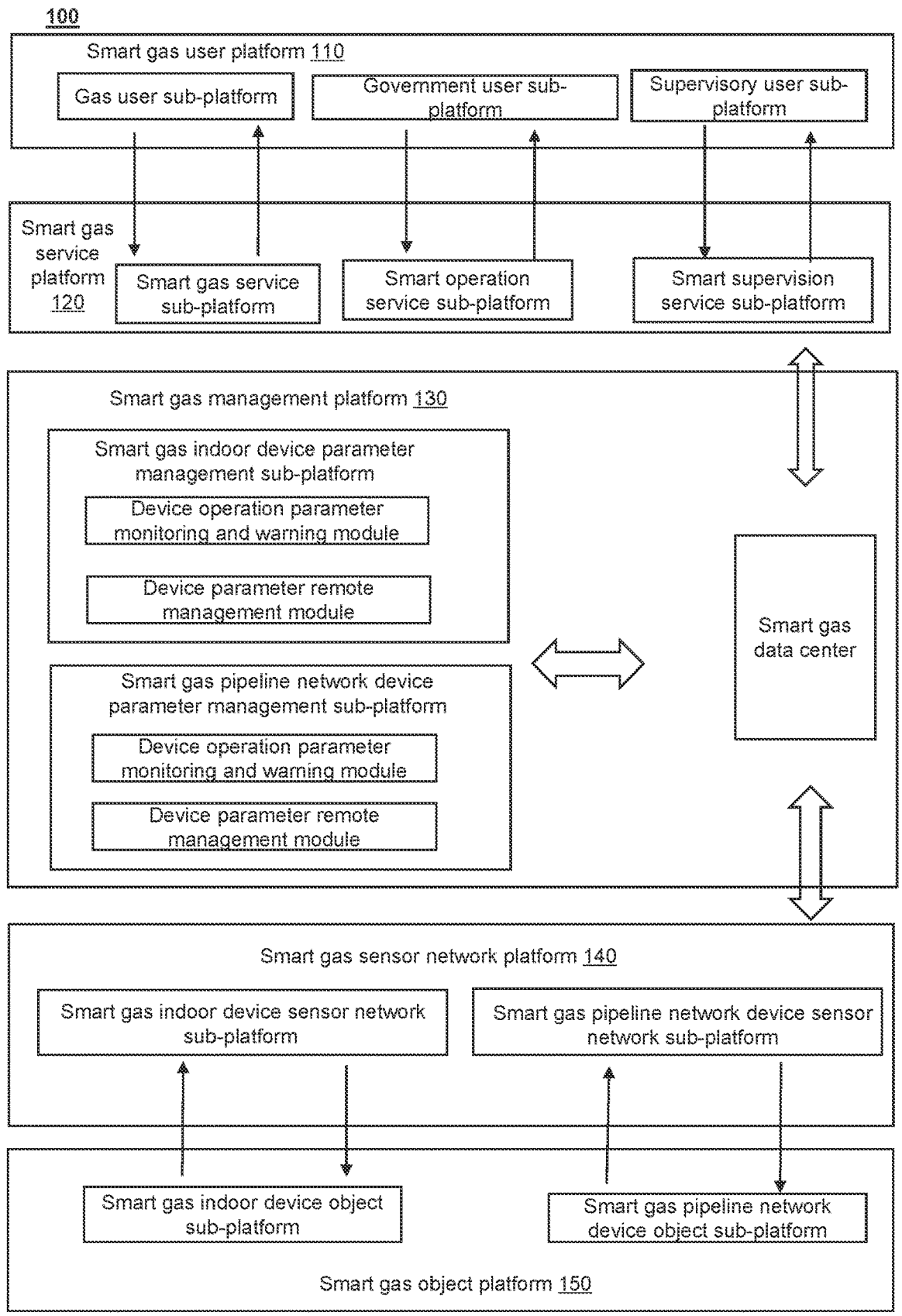
FIG. 1 is a schematic structural diagram of an Internet of things (IoT) system for monitoring a smart gas pipeline network based on an ultrasonic flowmeter according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic structural diagram of an Internet of things (IoT) system for monitoring a smart gas pipeline network based on an ultrasonic flowmeter according to some embodiments of the present disclosure. As shown in FIG. 1, an IoT system 100 may include a smart gas user platform 110, a smart gas service platform 120, a smart gas management platform 130, a smart gas sensor network platform 140, and a smart gas object platform 150 connected in sequence.

The smart gas user platform 110 may be a platform for interacting with users. In some embodiments, the smart gas user platform 110 may be configured as a terminal device.

In some embodiments, the smart gas user platform 110 may include a gas user sub-platform, a government user sub-platform, and a supervisory user sub-platform.

The gas user sub-platform may be a platform that provides gas users with data related to gas usage and solutions to gas problems. The gas users may include industrial gas users, commercial gas users, general gas users, or the like.

The supervisory user sub-platform may be a platform for supervisory users to supervise the operation of the entire IoT system 100. The supervisory users may include personnel of a safety management department, etc.

The government user sub-platform may be a platform that provides government users with data related to gas operation. The government users may include managers of a gas operation entity (e.g., managers of an administrative department), etc.

In some embodiments, the smart gas user platform 110 may send warning information or the like to the supervisory users based on the supervisory user sub-platform.

The smart gas service platform 120 may be a platform for communicating user requirements and control information. The smart gas service platform 120 may obtain the warning information or the like from the smart gas management platform 130 (e.g., a smart gas data center) and send the warning information to the supervisory user sub-platform.

In some embodiments, the smart gas service platform 120 may include a smart gas service sub-platform, a smart operation service sub-platform, and a smart supervision service sub-platform.

The smart gas service sub-platform may be a platform that provides gas service(s) for the gas users. The smart supervisory service sub-platform may be a platform that provides supervision requirements for the supervisory users. The smart operation service sub-platform may be a platform that provides the government users with relevant information on gas operation.

In some embodiments, the smart gas service platform 120 may send the warning information to the supervision user sub-platform based on the smart supervision service sub-platform.

The smart gas management platform 130 may be a platform for coordinating connection and collaboration between various functional platforms and gathering all information of the IoT system 100 and providing perception management and control management functions for the operation of the IoT system 100.

In some embodiments, the smart gas management platform 130 may include a smart gas indoor device parameter management sub-platform, a smart gas pipeline network device parameter management sub-platform, and a smart gas data center.

The smart gas indoor device parameter management sub-platform may be configured to monitor a leakage risk of indoor gas pipelines and give warning prompts. In some embodiments, the smart gas indoor device parameter management sub-platform may include, but is not limited to a device operation parameter monitoring and warning module and a device parameter remote management module. The smart gas indoor device parameter management sub-platform may analyze and process gas user-related information through the aforementioned management modules.

The smart gas pipeline network device parameter management sub-platform may be configured to monitor a leakage risk of gas pipelines and give warning prompts. In some embodiments, the smart gas pipeline network device parameter management sub-platform may include, but is not limited to a device operation parameter monitoring and warning module and a device parameter remote management module. The smart gas pipeline network device parameter management sub-platform may analyze and process distributed ultrasonic data through the aforementioned management modules.

The smart gas data center may be configured to store operation information related to the IoT system 100. In some embodiments, the smart gas data center may be configured as a storage device for storing data related to gas leakage or the like. For example, the smart gas data center may store the distributed ultrasonic data.

In some embodiments, the smart gas management platform 130 may exchange information with the smart gas service platform 120 and the smart gas sensor network platform 140, respectively, through the smart gas data center. For example, the smart gas data center may send the warning information to the smart gas service platform 120. As another example, the smart gas data center may send an instruction for acquiring distributed ultrasonic data to the smart gas sensor network platform 140 to acquire the distributed ultrasonic data.

The smart gas sensor network platform 140 may be a functional platform for managing sensor communication. In some embodiments, the smart gas sensor network platform 140 may realize the functions of sensory communication of perception information and sensory communication of control information.

In some embodiments, the smart gas sensor network platform 140 may include a smart gas indoor device sensor network sub-platform and a smart gas pipeline network device sensor network sub-platform, which may be configured to obtain operation information of the gas indoor device and gas pipeline network device, respectively.

The smart gas object platform 150 may be a functional platform for perception information generation and control information execution. For example, the smart gas object platform 150 may monitor and generate the operation information of the gas indoor device and the gas pipeline network device.

In some embodiments, the smart gas object platform 150 may include a smart gas indoor device object sub-platform and a smart gas pipeline network device object sub-platform. The smart gas indoor device object sub-platform may be configured as various gas indoor devices of the gas users. The smart gas pipeline network device object sub-platform may be configured as various gas pipeline network devices and monitoring devices.

In some embodiments of the present disclosure, the IoT system 100 for monitoring a smart gas pipeline network based on an ultrasonic flowmeter can form a closed loop of information operation between the smart gas object platform and the smart gas user platform, and coordinate and run regularly under unified management of the smart gas management platform to realize monitoring and early warning of the gas pipelines and informalized and intelligence of remote management.

Figure 2:
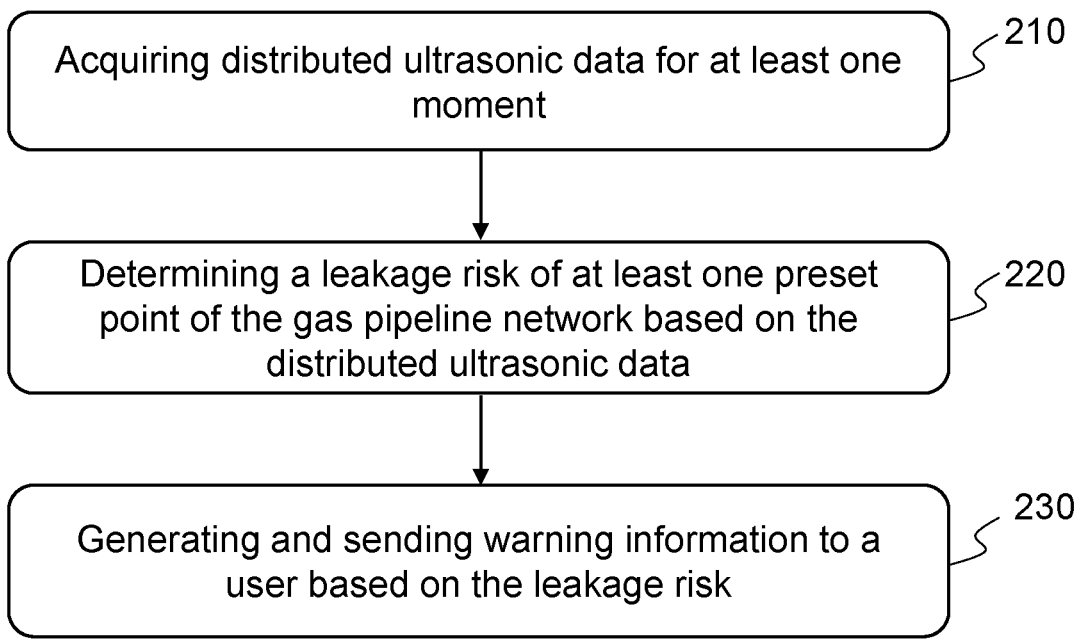
FIG. 2 is a flowchart of an exemplary method for monitoring a smart gas pipeline network based on an ultrasonic flowmeter according to some embodiments of the present disclosure.

FIG. 2 is a flowchart of an exemplary method for monitoring a smart gas pipeline network based on an ultrasonic flowmeter according to some embodiments of the present disclosure. In some embodiments, a process 200 may be implemented by the smart gas management platform of the IoT system for monitoring a smart gas pipeline network based on an ultrasonic flowmeter. As shown in FIG. 2, the process 200 may include Step 210, Step 220, and Step 230.

Step 210, acquiring distributed ultrasonic data for at least one moment.

The distributed ultrasonic data refers to ultrasonic data of different detection positions of the gas pipeline network. The distributed ultrasonic data may include ultrasonic data acquired by ultrasonic flowmeters at the different detection positions. The ultrasonic data refers to data related to transmission of ultrasonic waves acquired during a working process of the ultrasonic flowmeter. For example, the ultrasonic data may include time intervals when the ultrasonic flowmeter transmits and receives the ultrasonic waves or the like.

The ultrasonic flowmeter refers to an instrument configured to measure a flow of fluid in a pipeline. The ultrasonic flowmeter may be deployed in at least one detection position of the gas pipeline network. The detection position refers to a position in the gas pipeline network where the gas flow needs to be detected. For example, a plurality of ultrasonic flowmeters may be deployed in different gas pipelines or at different detection positions of a same gas pipeline.

The gas pipeline network refers to a pipeline network configured to transport and store gas. The gas pipeline network may include one or more gas pipelines.

In some embodiments, the ultrasonic flowmeter may be deployed on the gas pipeline of the gas pipeline network through a movable slide rail. The movable slide rail has a preset length, and the ultrasonic flowmeter may move within a preset length range on the movable slide rail, so as to detect a plurality of detection positions within the preset length range. The preset length may be determined according to monitoring requirements, historical experience, or the like. For example, the preset length may be 20 cm.

In some embodiments, the smart gas management platform may acquire the distributed ultrasonic data in various ways. For example, the ultrasonic flowmeter may upload the acquired distributed ultrasonic data to the smart gas data center of the smart gas management platform through the smart gas sensor network platform.

Step 220, determining a leakage risk of at least one preset point of the gas pipeline network based on the distributed ultrasonic data.

The preset point refers to a preset position in the gas pipeline network that needs to be detected for the leakage risk. For example, the preset point may be the detection position where the ultrasonic flowmeter is deployed. As another example, the preset point may be any position between two detection positions.

The leakage risk refers to a risk and a risk probability related to gas leakage. The leakage risk may include a first leakage risk and a second leakage risk. The leakage risk may also include other types, for example, no risk of leakage.

The first leakage risk refers to a risk and a risk probability related to a sudden leakage of gas. For example, the first leakage risk may include a risk and a risk probability of a sudden leakage of a large amount of gas caused by a sudden rupture of the gas pipeline.

The second leakage risk refers to a risk and a risk probability related to a stable low-volume leakage of gas. For example, the second leakage risk may include gas pipeline perforation, a risk and a risk probability of a continuous low-volume leakage of gas, etc.

In some embodiments, the smart gas management platform may determine the leakage risk of the at least one preset point of the gas pipeline network based on the distributed ultrasonic data in various ways. For example, a reference gas flow rate in each gas pipeline of the gas pipeline network may be stored in a storage device in advance, and the smart gas management platform may calculate an actual gas flow rate in the each gas pipeline based on the distributed ultrasonic data. A flow rate difference is calculated based on the actual gas flow rate and the reference flow rate, and the leakage risk is determined based on the flow rate difference. The reference flow rate may be determined based on a maximum value of a historical flow rate of the gas in the gas pipeline network.

The smart gas management platform may also determine the leakage risk of the gas pipeline network through other monitoring data. For example, the smart gas management platform may determine the leakage risk based on pressure data acquired by a pressure sensor installed inside the gas pipeline.

Figure 3:
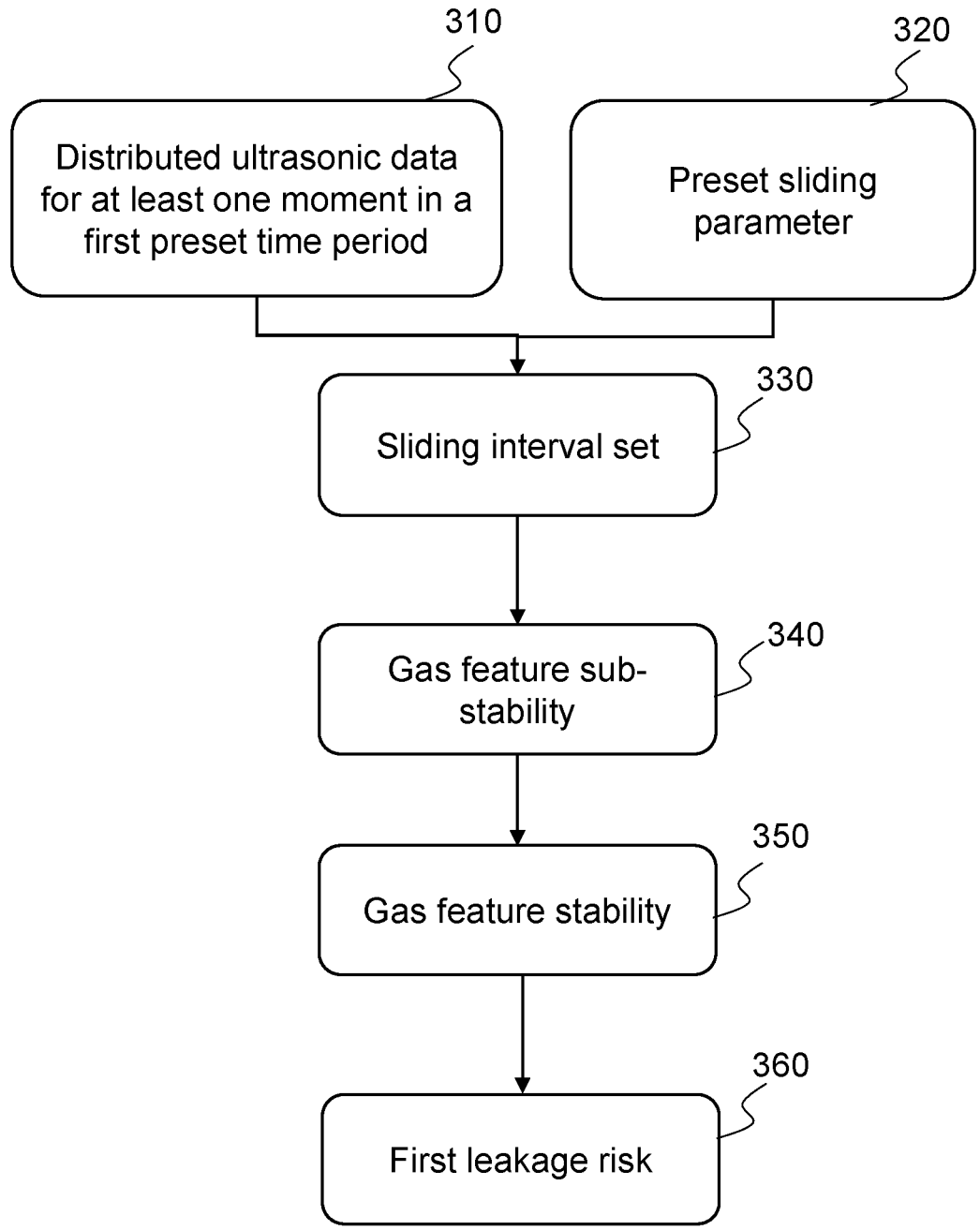
FIG. 3 is a schematic diagram of an exemplary process for determining a first leakage risk according to some embodiments of the present disclosure.

For more descriptions on determining the first leakage risk and the second leakage risk, please refer to FIG. 3 and related descriptions.

Step 230, generating and sending warning information to a user based on the leakage risk.

The warning information refers to information configured to remind or warn the user. For example, the warning information may include, but is not limited to, a sudden leakage of the gas pipeline, a continuous low-volume leakage of the gas pipeline, or the like.

In some embodiments, the smart gas management platform may generate the warning information based on the leakage risk in various ways. For example, the storage device may pre-store a corresponding relationship between different leakage risks and the warning information, and the smart gas management platform may access the storage device based on the determined leakage risks and generate the warning information through the corresponding relationship.

The smart gas management platform may send the warning information to the smart gas user platform through the smart gas service platform and display the warning information to the user through the smart gas user platform.

In some embodiments of the present disclosure, by acquiring the distributed ultrasonic data through the ultrasonic flowmeter deployed in the gas pipeline network to determine the leakage risk, the leakage risk can be discovered in time and the user can be reminded to check and repair the gas pipeline with the leakage risk, realizing real-time monitoring of the gas pipeline network.

It should be noted that the above description of the process 200 is only for illustration and explanation, and does not limit the scope of the present disclosure. For those skilled in the art, various modifications and changes may be made to the process 200 under the guidance of the present disclosure. However, such modifications and changes are still within the scope of the present disclosure.

FIG. 3 is a schematic diagram of an exemplary process for determining a first leakage risk according to some embodiments of the present disclosure.

In some embodiments, the smart gas management platform may determine a gas feature stability 350 based on distributed ultrasonic data for at least one moment in a first preset time period 310; and determine a first leakage risk 360 based on the gas feature stability 350.

For more information about the distributed ultrasonic data and the first leakage risk, please refer to FIG. 2 and its related descriptions.

The first preset time period refers to a historical time period preset in advance.

The gas feature stability refers to a parameter for reflecting a gas feature stability at a plurality of moments. The gas feature stability may be represented by a real number. The smaller the number, the worse the gas feature stability at the plurality of moments.

The gas feature refers to a feature related to a state of gas in a gas pipeline. For example, the gas feature may include but is not limited to, a flow rate and pressure of gas in the gas pipeline.

In some embodiments, the smart gas management platform may determine the gas feature stability based on the distributed ultrasonic data for at least one moment in the first preset time period in various ways. For example, the smart gas management platform may calculate flow rates of the gas at each detection position of the gas pipeline network at the plurality of moments based on the distributed ultrasonic data for at least one moment in the first preset time period. Further, the smart gas management platform may calculate a variance of the flow rates of the gas at the plurality of moments at the same detection position, and determine a reciprocal of the calculated variance as the gas feature stability of the detection position.

In some embodiments, the smart gas management platform may divide the distributed ultrasonic data for at least one moment into at least one sliding interval set 330 based on a preset sliding parameter 320, determine a gas feature sub-stability 340 of each of the at least one sliding interval set; and determine the gas feature stability 350 based on the gas feature sub-stability 340 of the each of the at least one sliding interval set.

The preset sliding parameter refers to a parameter configured to divide data for the plurality of moments into a plurality of groups of data. For example, the preset sliding parameter may include a sliding interval size and a sliding step. The sliding interval size refers to an amount of data included in each sliding interval. The sliding step refers to an amount of data between every two adjacent sliding intervals. The preset sliding parameter may be a preset value, an empirical value, or the like.

The sliding interval set refers to a set including a plurality of sliding intervals.

Merely by way of example, it is assumed that the distributed ultrasonic data for the plurality of moments include distributed ultrasonic data for 1000 moments, and the distributed ultrasonic data for the plurality of moments are respectively numbered as 1, 2, . . . , and 1000. The preset sliding parameter includes a preset sliding parameter 1 and a preset sliding parameter 2. The preset sliding parameter 1 includes a sliding interval size of 200 and a sliding step of 10; and the preset sliding parameter 2 includes a sliding interval size of 300 and a sliding step of 20. The smart gas management platform may divide the distributed ultrasonic data into two sliding interval sets based on the preset sliding parameters. A sliding interval set 1 corresponding to the preset sliding parameter 1 may include [1, 200], [11, 210], [21, 220], . . . , and [801, 1000]; and a sliding interval set 2 corresponding to the preset sliding parameter 2 may include [1, 300], [21, 320], [41, 340], . . . , and [701, 1000]. One interval of the sliding interval set is a sliding interval, for example, [1, 200] is a sliding interval.

The gas feature sub-stability refers to a parameter configured to reflect a stability of data concentrated in the sliding interval. The gas feature sub-stability may be represented by a real number, and the smaller the number, the worse the stability of the data in the sliding interval.

In some embodiments, the smart gas management platform may determine the gas feature sub-stability of each sliding interval set in various ways. For example, for each sliding interval in the sliding interval set, the smart gas management platform may calculate variances of the data in the sliding intervals, sum the variances calculated for all sliding intervals in the sliding interval set, and determine a reciprocal of a summed value as the gas feature sub-stability of the sliding interval set.

In some embodiments, for each sliding interval set, the smart gas management platform may determine a data stability of each sliding interval of the sliding interval set; and determine the gas feature sub-stability of the sliding interval set based on the data stability of the each sliding interval.

The data stability refers to a parameter configured to reflect the stability of data in the sliding interval. The data stability may be represented by a real number, and the smaller the number, the worse the stability of the data in the sliding interval.

In some embodiments, the smart gas management platform may determine the data stability of the each sliding interval in various ways. For example, for each sliding interval, the smart gas management platform may calculate a variance of the data in the sliding interval, and determine a reciprocal of the calculated variance as the data stability of the sliding interval.

In some embodiments, for each sliding interval, the smart gas management platform may perform a stationarity test on the distributed ultrasonic data corresponding to the sliding interval; and determine the data stability of the sliding interval based on a result of the stationarity test.

The stationarity test refers to a test configured to test the stability of the data. For example, the stationarity test may include a unit root test, an augmented Dickey-Fuller test (hereinafter referred to as an ADF test), or the like.

In some embodiments, the smart gas management platform may determine the data stability of the sliding interval based on the result of the stationarity test in various ways. For example, when the smart gas management platform detects the distributed ultrasonic data corresponding to the sliding interval through the ADF test, the smaller the p-value of the ADF test, the more stable the data in the sliding interval, and the greater the corresponding data stability.

In some embodiments of the present disclosure, the data stability is determined by performing the stationarity test on the distributed ultrasonic data corresponding to the sliding interval, so that the determined data stability is more accurate and errors in manual determination are avoided.

In some embodiments, the smart gas management platform may determine the gas feature sub-stability of the sliding interval set based on the data stability of the each sliding interval in various ways. For example, the smart gas management platform may add and sum the data stability of the each sliding interval and determine a summed value as the gas feature sub-stability of the sliding interval set.

In some embodiments, the smart gas management platform may also perform a weighted summation on the data stability of each sliding interval in the sliding interval set according to a certain weight, and determine a summed value as the gas feature sub-stability of the sliding interval set. The weight corresponding to the data stability of the each sliding interval may be related to a size of the data stability of the sliding interval. The worse the stability of the data in the sliding interval, that is, the smaller the data stability, and the greater the weight corresponding to the data stability.

In one embodiment of the present disclosure, when the weighted summation is performed on the data stability of the sliding interval in the sliding interval set to determine the gas feature sub-stability, the weight corresponding to the data stability of each sliding interval is related to the data stability, and the worse the stability of the data, the greater the corresponding weight, which is conducive to increasing reinforcement feedback and making it easier to find abnormal fluctuations. When there is only a small count of sliding intervals with a weak stability in the plurality of sliding intervals, if the summation is equal-weighted, instability may be overwhelmed because of the small count of sliding intervals with a weak stability. Therefore, by increasing the weight of the data stability of the sliding interval with a weak stability, it is conducive to highlighting the instability of the sliding interval so as to better predict the first leakage risk.

In some embodiments of the present disclosure, based on the data stability of the each sliding interval, the gas feature sub-stability is determined. Since the stability of the data in each sliding interval is considered, it is conducive to improving accuracy of the determined gas feature sub-stability.

In some embodiments, the smart gas management platform may determine a gas feature stability based on the gas feature sub-stability of the at least one sliding interval set in various ways. For example, the smart gas management platform may add and sum gas feature sub-stabilities of a plurality of sliding interval sets and determine a summed value as the gas feature stability.

In some embodiments, the smart gas management platform may perform a weight summation on the gas feature sub-stabilities of the plurality of sliding interval sets according to a certain weight and determine a summed value as the gas feature stability. The weight corresponding to the gas feature sub-stability of the each sliding interval set may be related to the preset sliding parameter corresponding to the sliding interval set. For example, the larger the size of the sliding interval and the smaller the sliding step in the preset sliding parameter corresponding to the sliding interval set, the greater the weight corresponding to the gas feature sub-stability of the sliding interval set.

In some embodiments of the present disclosure, when performing the weighted summation of the gas feature sub-stability of the plurality of sliding interval sets to determine the gas feature stability, the larger the size of the sliding interval corresponding to the sliding interval set and the smaller the sliding step, the more abundant the amount of data corresponding to the sliding interval set, the greater the corresponding weight in the weighted summation, which is conducive to improving the accuracy of the determined gas feature stability.

In some embodiments of the present disclosure, by dividing the distributed ultrasonic data for the plurality of moments into the plurality of sliding interval sets, the gas feature stability is determined based on the gas feature sub-stability of the sliding interval set, which is conducive to expanding the amount of data, so that the determined gas feature stability is more accurate.

In some embodiments, the smart gas management platform may determine the first leakage risk based on the gas feature stability in various ways. For example, the worse the stability of the gas feature, that is, the smaller the gas feature stability, the greater the first leakage risk.

When the first leakage risk occurs in the gas pipeline, the flow rate and the pressure of the gas in the gas pipeline may change greatly, and the gas feature stability may be determined through the collected distributed ultrasonic data; and the first leakage risk is determined based on the gas feature stability, which is conducive to improving the accuracy of determining the first leakage risk.

In some embodiments, the smart gas management platform may determine a second leakage risk based on distributed ultrasonic data for at least one moment in a second preset time period.

For more information about the distributed ultrasonic data and the second leakage risk, please refer to FIG. 2 and its related descriptions.

The second preset time period refers to a preset historical time period. The second preset time period may be the same as or different from the first preset time period.

In some embodiments, the smart gas management platform may determine the second leakage risk based on the distributed ultrasonic data for the at least one moment in the second preset time period in various ways. For example, the smart gas management platform may determine the second leakage risk through a preset data comparison table based on the distributed ultrasonic data for the at least one moment in the second preset time period. The second leakage risks corresponding to different distributed ultrasonic data are recorded in the preset data comparison table. The preset data comparison table may be preset based on prior knowledge or historical data.

In some embodiments, the smart gas management platform may determine the second leakage risk by processing the distributed ultrasonic data for the least one moment in the second preset time period through a low-volume leakage prediction model, and the low-volume leakage prediction model is a machine learning model. For more details about the above embodiments, refer to FIG. 4 and related descriptions thereof.

In some embodiments of the present disclosure, the second leakage risk is determined based on the distributed ultrasonic data for the at least one moment in the second preset time period, so as to realize the monitoring of a continuous low-volume leakage risk of the gas in the gas pipeline.

Figure 4:
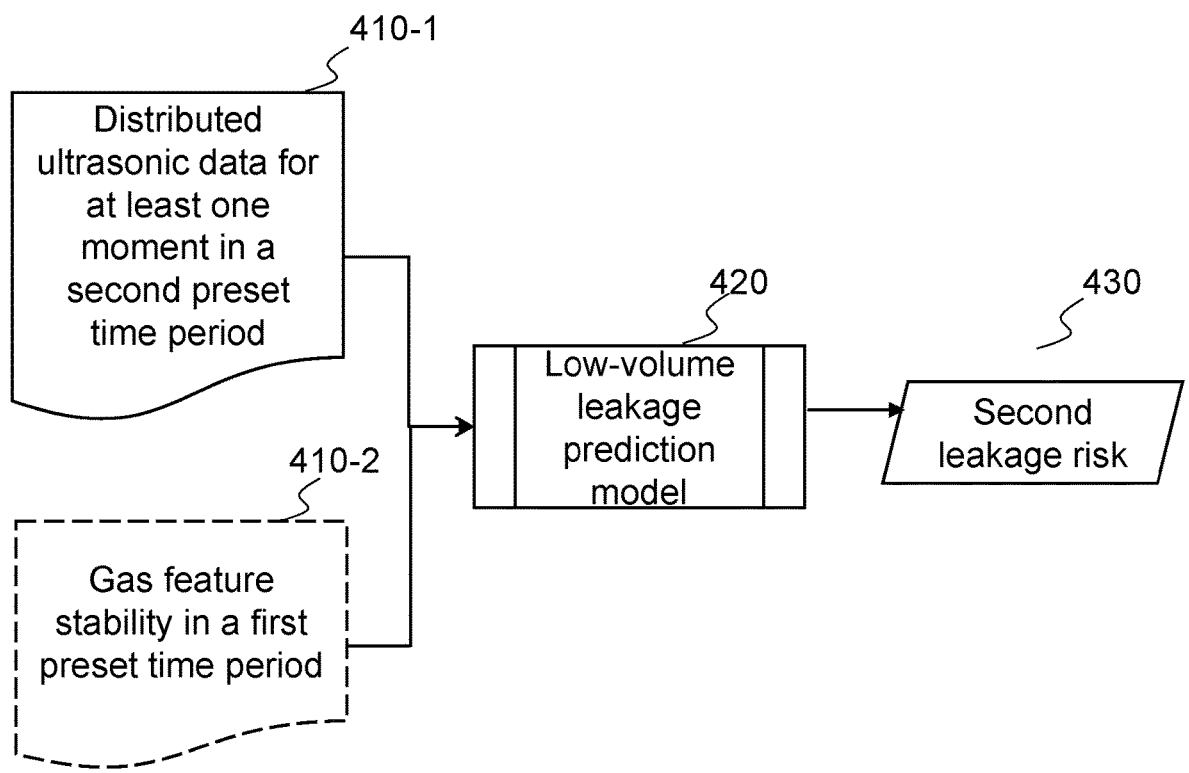
FIG. 4 is an exemplary schematic diagram of a low-volume leakage prediction model according to some embodiments of the present disclosure.

FIG. 4 is an exemplary schematic diagram of a low-volume leakage prediction model according to some embodiments of the present disclosure The low-volume leakage prediction model may be a machine learning model configured to determine a second leakage risk. For example, the low-volume leakage prediction model may include a deep neural network (DNN) model or the like.

In some embodiments, an input of a low-volume leakage prediction model 420 may include distributed ultrasonic data for at least one moment in a second preset time period 410-1; and an output may include a second leakage risk 430. For more information about the distributed ultrasonic data and the second leakage risk, please refer to FIG. 2 and its related descriptions.

In some embodiments, the input of the low-volume leakage prediction model may also include a gas feature stability in a first preset time period 410-2. For more information about the gas feature stability in the first preset time period, please refer to FIG. 3 and its related descriptions.

In some embodiments of the present disclosure, by using the gas feature stability in the first preset time period as the input of the low-volume leakage prediction model, a degree of change of the gas feature in the first preset time period is considered, so that the final outputted second leakage risk is more accurate.

In some embodiments, the low-volume leakage prediction model 420 may be obtained by training a plurality of first training samples with a first label.

In some embodiments, the first training sample may include sample distributed ultrasonic data for at least one moment in a sample second preset time period. The first label may include a sample second leakage risk corresponding to the first training sample. In some embodiments, the first training samples may be obtained based on historical data (e.g., historical distributed ultrasonic data). The first label may be determined in the following process: under a condition that the historical distributed ultrasonic data corresponding to the first training samples are the same, a count of historical actual occurrences of the second leakage risk are counted. The count of historical actual occurrences is divided by a count of historical total occurrences in this condition, and a calculated value is determined as an occurrence probability of the second leakage risk.

In some embodiments of the present disclosure, the distributed ultrasonic data for the at least one moment in the second preset time period is processed by the low-volume leakage prediction model to determine the second leakage risk, and an influence of various factors may be considered at the same time, so that the determination of the second leakage risk is more efficient and accurate, thereby avoiding errors in manual determination.

In some embodiments, the smart gas management platform may input the distributed ultrasonic data collected by at least one group of ultrasonic flowmeters with different detection position distributions into the low-volume leakage prediction model to determine at least one candidate second leakage risk; and determine the second leakage risk based on the at least one candidate second leakage risk.

The detection position distribution refers to a distribution related to a plurality of detection positions. The smart gas management platform may generate a plurality of different detection position distributions through random (for example, Gaussian random, etc.) generation. For more information about the detection position, please refer to FIG. 2 and its related descriptions.

The candidate second leakage risk refers to an optional second leakage risk.

In some embodiments, the smart gas management platform may determine the second leakage risk based on the at least one candidate second leakage risk in various ways. For example, the smart gas management platform may add and sum a plurality of candidate second leakage risks or obtain an average value after the summing, and determine a summed value or the average value after the summing as the second leakage risk.

In some embodiments, the smart gas management platform may perform a weighted summation on the plurality of candidate second leakage risks according to a certain weight and determine a summed value as the second leakage risk. The weight corresponding to each candidate second leakage risk is related to a difference between the detection position distribution corresponding to the candidate second leakage risk and a preferred detection position distribution. For more information about the preferred detection position distribution, please refer to FIG. 5 and its related descriptions.

Merely by way of example, it is assumed that the plurality of detection position distributions include a detection position distribution $s_1$, a detection position distribution $s_2$, . . . , and a detection position distribution $s_n$; and the distributed ultrasonic data corresponding to the each detection position distribution are input into the low-volume leakage prediction model, and the corresponding candidate second leakage risks are determined as a candidate second leakage risk $x_1$, a candidate second leakage risk $x_2$, . . . , and a candidate second leakage risk $x_n$. Then the second leakage risk may be calculated by using a formula: $Q=k_1*x_1+k_2*x_2+ \ldots +k_n*x_n$, where Q is the second leakage risk; $k_1$, $k_2$, . . . , and $k_n$ respectively correspond to the weights of candidate second leakage risks $x_1$, $x_2$, . . . , and $x_n$. The weight $k_1$ may be determined based on a difference between the detection position distribution $s_1$ and the preferred detection position distribution, the larger the difference, the smaller the $k_1$; and the determination manner for a weight $k_2$, . . . , and a weight $k_n$ is similar to the determination manner for weight $k_1$.

In some embodiments of the present disclosure, the low-volume leakage prediction model is configured to process the plurality of distributed ultrasonic data with different detection position distributions to determine the corresponding candidate second leakage risk; and based on the difference between the corresponding detection position distribution and the preferred detection position distribution, the second leakage risk is determined by performing a weighted summation. This process not only expands an amount of calculated data, but also increases the weight corresponding to the data closer to the preferred detection position distribution, which is conducive to improving the accuracy of the determination of the second leak risk.

Figure 5:
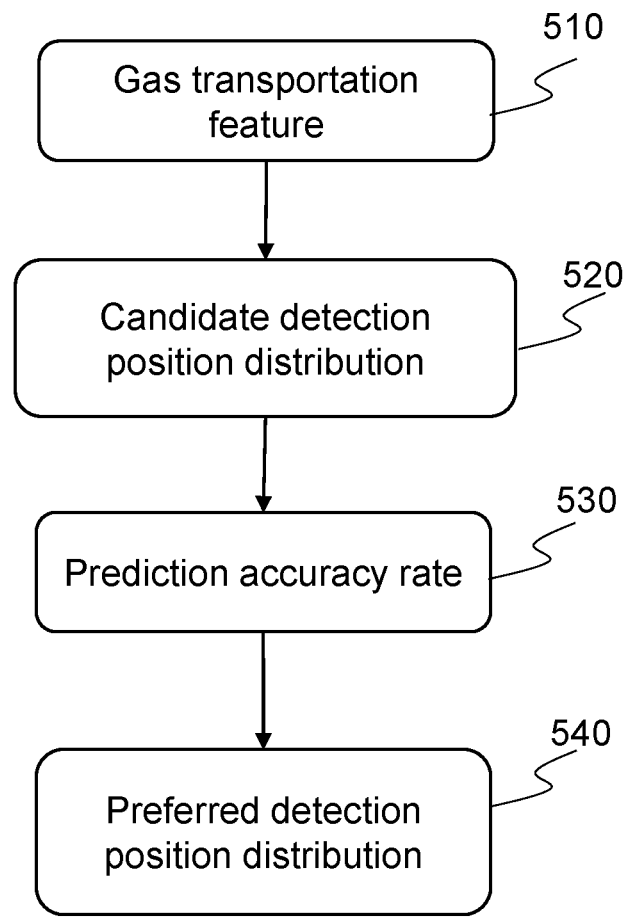
FIG. 5 is a schematic diagram of an exemplary process for determining a preferred detection position distribution according to some embodiments of the present disclosure.

FIG. 5 is a schematic diagram of an exemplary process for determining a preferred detection position distribution according to some embodiments of the present disclosure.

In some embodiments, the smart gas management platform may determine a preferred detection position distribution 540 based on a gas transportation feature 510 of a gas pipeline of a gas pipeline network.

The gas transportation feature refers to a feature related to the transportation of gas in the gas pipeline. For example, the gas transportation feature may include a gas flow rate or the like.

The smart gas management platform may obtain the gas transportation feature by accessing a storage device of an ultrasonic flowmeter.

The preferred detection position distribution refers to a distribution related to preferred detection positions. For example, the preferred detection position distribution may include preferred detection positions of one or more ultrasonic flowmeters.

The preferred detection positions refer to proper installation and detection positions of the ultrasonic flowmeters on the gas pipeline.

In some embodiments, the smart gas management platform may determine the preferred detection position distribution based on the gas transportation feature of the gas pipeline of the gas pipeline network in various ways. For example, the smart gas management platform may determine the preferred detection position distribution based on the gas transportation feature using a preset data comparison table. The preset data comparison table records preferred detection position distributions corresponding to different gas transportation features.

In some embodiments, the smart gas management platform may generate at least one candidate detection position distribution 520 based on the gas transportation feature 510 of the gas pipeline of the gas pipeline network; determine a prediction accuracy rate 530 of each of the at least one candidate detection position distribution; and determine the preferred detection position distribution 540 based on the prediction accuracy rate 530.

The candidate detection position distributions refer to optional detection position distributions.

The smart gas management platform may generate the candidate detection position distributions in various ways. For example, the smart gas management platform may generate the candidate detection position distributions through random (e.g., Gaussian random, etc.) generation.

The prediction accuracy rate refers to a parameter configured to evaluate an accuracy of a prediction of the candidate detection position distribution on a gas leakage risk.

In some embodiments, the smart gas management platform may determine the prediction accuracy rate of each of the at least one candidate detection position distribution in various ways. For example, the smart gas management platform may construct a target vector based on the candidate detection position distribution and gas transportation feature; determine a correlation vector through a vector database based on the target vector; and determine a reference prediction accuracy rate corresponding to the correlation vector as the prediction accuracy rate corresponding to the target vector.

The target vector refers to a vector constructed based on the candidate detection position distribution and the gas transportation feature. There are various ways to construct the target vector. For example, a processor may input the candidate detection position distribution and the gas transportation feature into an embedding layer for processing to obtain the target vector. The embedding layer may be jointly trained with a low-volume leakage prediction model.

The vector database includes a plurality of reference vectors, and each of the plurality of reference vectors has a corresponding reference prediction accuracy rate.

The reference vector refers to a vector constructed based on a historical candidate detection position distribution and a historical gas transportation feature in a historical time period, and the reference prediction accuracy rate corresponding to the reference vector may be a historical prediction accuracy rate in the historical time period. For a process for constructing the reference vector, please refer to the above description on constructing the target vector.

In some embodiments, the smart gas management platform may separately calculate a vector distance between the target vector and the reference vector to determine the prediction accuracy rate of the target vector. For example, a reference vector whose vector distance from the target vector satisfies a preset condition is used as an associated vector, and a reference prediction accuracy rate corresponding to the correlation vector is used as the prediction accuracy rate corresponding to the target vector. The preset condition may be set according to situations. For example, the preset condition may be that the vector distance is the smallest, the vector distance is smaller than a distance threshold, or the like. The vector distance may include, but is not limited to, a cosine distance, a Mahalanobis distance, a Euclidean distance, or the like.

In some embodiments, the smart gas management platform may process the candidate detection position distribution and the gas transportation feature through an accuracy prediction model to determine the prediction accuracy rate.

The accuracy prediction model may be a machine learning model configured to determine the prediction accuracy rate, for example, a deep neural network (DNN) model, etc.

In some embodiments, an input of the accuracy prediction model may include the candidate detection position distribution and the gas transportation feature; and an output may include the prediction accuracy rate. For more information on the preferred detection position distribution, the gas transportation feature, and the prediction accuracy rate, please refer to the above related descriptions.

In some embodiments, the accuracy prediction model may be obtained by training a plurality of second training samples with a second label.

In some embodiments, the second training samples may include sample candidate detection position distributions and sample gas transportation features. The second label may include a sample prediction accuracy rate corresponding to the second training samples. In some embodiments, the second training samples may be obtained based on historical data (e.g., a historical detection position distribution and a historical gas transportation feature). The second label may be determined by: based on the historical detection position distribution and the historical gas transportation feature corresponding to the second training samples, obtaining a count of historical actual occurrences of a first leakage risk and a second leakage risk, and determining the prediction accuracy rate through dividing the count of historical actual occurrences by a total count of predicted occurrences.

In some embodiments of the present disclosure, the accuracy prediction model is configured to process the candidate detection position distribution and the gas transportation feature to determine the prediction accuracy rate, and an influence of various factors may be considered at the same time, so that the determination of the prediction accuracy rate is more efficient and accurate, avoiding errors in manual determination.

In some embodiments, the smart gas management platform may determine the preferred detection position distribution based on the prediction accuracy rate in various ways. For example, the smart gas management platform may rank prediction accuracy rates corresponding to all candidate detection position distributions according to size, and determine a candidate detection position distribution corresponding to a largest prediction accuracy rate as the preferred detection position distribution. As another example, the smart gas management platform may rank the prediction accuracy rate rates corresponding to all candidate detection position distributions according to the size, and determine one of the candidate detection position distributions whose prediction accuracy rate is greater than a preset threshold as the preferred detection position distribution.

In some embodiments of the present disclosure, a plurality of candidate detection position distributions are randomly generated based on the gas transportation feature, and the preferred detection position distribution is determined according to the prediction accuracy rate corresponding to each of the at least one candidate detection position distribution, which not only enriches an amount of calculated data, but also considers the prediction accuracy rates of different candidate detection position distributions on the gas leakage risk, enabling a better detection effect of the finally determined detection position on gas leakages, which is conducive to improving the accuracy of judging the gas leakage risk.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for monitoring a smart gas pipeline network based on an ultrasonic flowmeter implemented by a smart gas management platform of an Internet of things (IoT) system for monitoring a smart gas pipeline network based on an ultrasonic flowmeter, comprising:
    acquiring distributed ultrasonic data for at least one moment, the distributed ultrasonic data including ultrasonic data acquired by the ultrasonic flowmeter and the ultrasonic flowmeter being deployed at at least one detection position of the gas pipeline network; the distributed ultrasonic data being ultrasonic data of different detection positions of the gas pipeline network;
    determining a leakage risk of at least one preset point of the gas pipeline network based on the distributed ultrasonic data; and the leakage risk including a first leakage risk, and determining the first leakage risk including:
        dividing, based on a preset sliding parameter, the distributed ultrasonic data for the at least one moment into at least one sliding interval set, and determining a gas feature sub-stability of each of the at least one sliding interval set, the preset sliding parameter being a parameter used to divide the distributed ultrasonic data for a plurality of moments into a plurality of groups of data, the sliding interval set being a set including a plurality of sliding intervals;

determining a gas feature stability based on the gas feature sub-stability of the each of the at least one sliding interval set, the gas feature sub-stability being used to reflect a stability of data of the sliding interval set, the gas feature stability being used to reflect a gas feature stability at the plurality of moments; and determining the first leakage risk based on the gas feature stability, the first leakage risk being a risk and a risk probability related to a sudden leakage of gas; and generating and sending warning information to a user based on the leakage risk.

2. The method according to claim 1, wherein the leakage risk further includes a second leakage risk, and the determining a leakage risk of at least one preset point of the gas pipeline network based on the distributed ultrasonic data includes:

determining the second leakage risk based on distributed ultrasonic data for at least one moment in a second preset time period, the second leakage risk being a risk and a risk probability related to a stable low-volume leakage of gas.

3. The method according to claim 2, wherein the determining the second leakage risk based on the distributed ultrasonic data for the at least one moment in a second preset time period includes:

processing the distributed ultrasonic data for the at least one moment in the second preset time period through a low-volume leakage prediction model to determine the second leakage risk, the low-volume leakage prediction model being a machine learning model.

4. The method according to claim 3, wherein an input of the low-volume leakage prediction model includes a gas feature stability in a first preset time period.

5. The method according to claim 1, wherein the ultrasonic flowmeter is deployed on a gas pipeline of the gas pipeline network through a movable slide rail, the movable slide rail has a preset length, and the method further comprises:

determining a preferred detection position distribution based on a gas transportation feature of the gas pipeline of the gas pipeline network, the gas transportation feature being a feature related to transportation of gas in the gas pipeline, the preferred detection position distribution including one or more preferred detection positions of the ultrasonic flowmeter, the preferred detection positions being proper installation and detection positions of ultrasonic flowmeters on the gas pipeline, and the preferred detection position distribution being a distribution related to the preferred detection positions.

6. The method according to claim 5, wherein the determining a preferred detection position distribution based on a gas transportation feature of the gas pipeline of the gas pipeline network includes:

generating at least one candidate detection position distribution based on the gas transportation feature of the gas pipeline of the gas pipeline network, the candidate detection position distribution being an optional detection position distribution;

determining a prediction accuracy rate of each of the at least one candidate detection position distribution, the prediction accuracy rate being used to evaluate an accuracy of a prediction of the candidate detection position distribution on the gas leakage risk; and determining the preferred detection position distribution based on the prediction accuracy rate.

7. An Internet of things (IoT) system for monitoring a smart gas pipeline network based on an ultrasonic flowmeter, comprising a smart gas object platform, a smart gas sensor network platform, a smart gas management platform, a smart gas service platform, and a smart gas user platform, wherein the smart gas object platform is configured to acquire distributed ultrasonic data for at least one moment, the distributed ultrasonic data includes ultrasonic data acquired by the ultrasonic flowmeter and the ultrasonic flowmeter being deployed at at least one detection position of the gas pipeline network; the distributed ultrasonic data is ultrasonic data of different detection positions of the gas pipeline network;

the smart gas sensor network platform is configured to transmit the distributed ultrasonic data to the smart gas management platform;

the smart gas management platform is configured to determine a leakage risk of at least one preset point of the gas pipeline network based on the distributed ultrasonic data and generate warning information based on the leakage risk, the leakage risk include a first leakage risk, and determining the first leakage risk includes:

dividing, based on a preset sliding parameter, the distributed ultrasonic data for the at least one moment into at least one sliding interval set, and determining a gas feature sub-stability of each of the at least one sliding interval set, the preset sliding parameter being a parameter used to divide the distributed ultrasonic data for a plurality of moments into a plurality of groups of data, the sliding interval set being a set including a plurality of sliding intervals;

determining a gas feature stability based on the gas feature sub-stability of the each of the at least one sliding interval set, the gas feature sub-stability being used to reflect a stability of data of the sliding interval set, the gas feature stability being used to reflect a gas feature stability at the plurality of moments; and determining the first leakage risk based on the gas feature stability, the first leakage risk being a risk and a risk probability related to a sudden leakage of gas;

the smart gas service platform is configured to send the warning information to the smart gas user platform; and the smart gas user platform is configured to display the warning information to a user.

* * * * *